United States Patent
Depta

(10) Patent No.: US 8,140,747 B2
(45) Date of Patent: Mar. 20, 2012

(54) OPERATING METHOD FOR A MEMORY SUBSYSTEM AND DEVICES FOR EXECUTING THE OPERATING METHOD

(75) Inventor: Robert Depta, Augsburg (DE)

(73) Assignee: Fujitsu Technology Solutions Intellectual Property GmbH, Munich (DE)

(*) Notice: Subject to any disclaimer, the term of this patent is extended or adjusted under 35 U.S.C. 154(b) by 357 days.

(21) Appl. No.: 12/463,314

(22) Filed: May 8, 2009

(65) Prior Publication Data

US 2009/0282191 A1 Nov. 12, 2009

(30) Foreign Application Priority Data

May 8, 2008 (DE) .......................... 10 2008 022 831

(51) Int. Cl.
  *G06F 12/00* (2006.01)
(52) U.S. Cl. ......... 711/112; 711/113; 711/114; 711/103
(58) Field of Classification Search .......... 711/112–114, 711/103, 162, 170, E12.019, E12.001
  See application file for complete search history.

(56) References Cited

U.S. PATENT DOCUMENTS

| | | | |
|---|---|---|---|
| 7,472,219 B2 * | 12/2008 | Tamura et al. ................ | 711/103 |
| 7,490,197 B2 * | 2/2009 | Kirshenbaum et al. ....... | 711/112 |
| 2006/0004795 A1 | 1/2006 | Shah et al. | |
| 2006/0090031 A1 | 4/2006 | Kirshenbaum et al. | |

FOREIGN PATENT DOCUMENTS

| | | |
|---|---|---|
| DE | 199 60 114 A1 | 6/2001 |
| DE | 11 2005 001 430 T5 | 5/2007 |
| EP | 1 890 236 A2 | 2/2008 |

OTHER PUBLICATIONS

"Windows PC Accelerators: Performance Technology for Windows Vista," http://www.microsoft.com/whdc/system/sysperf/accelerator.mspx, Dec. 5, 2006, 1 page.

* cited by examiner

*Primary Examiner* — David Lam
(74) *Attorney, Agent, or Firm* — Slater & Matsil, L.L.P.

(57) ABSTRACT

A memory subsystem has at least one first mass memory with a solid-state memory medium, at least one second mass memory with a moving read/write head or moving memory medium, and at least one control unit for controlling the first mass memory and the second mass memory. A method of operating the memory subsystem includes receiving a request for storing or reading data, defining first and second memory regions in the first and second mass memories, respectively, and transmitting first and second subrequests to the first and second memory regions, respectively.

14 Claims, 6 Drawing Sheets

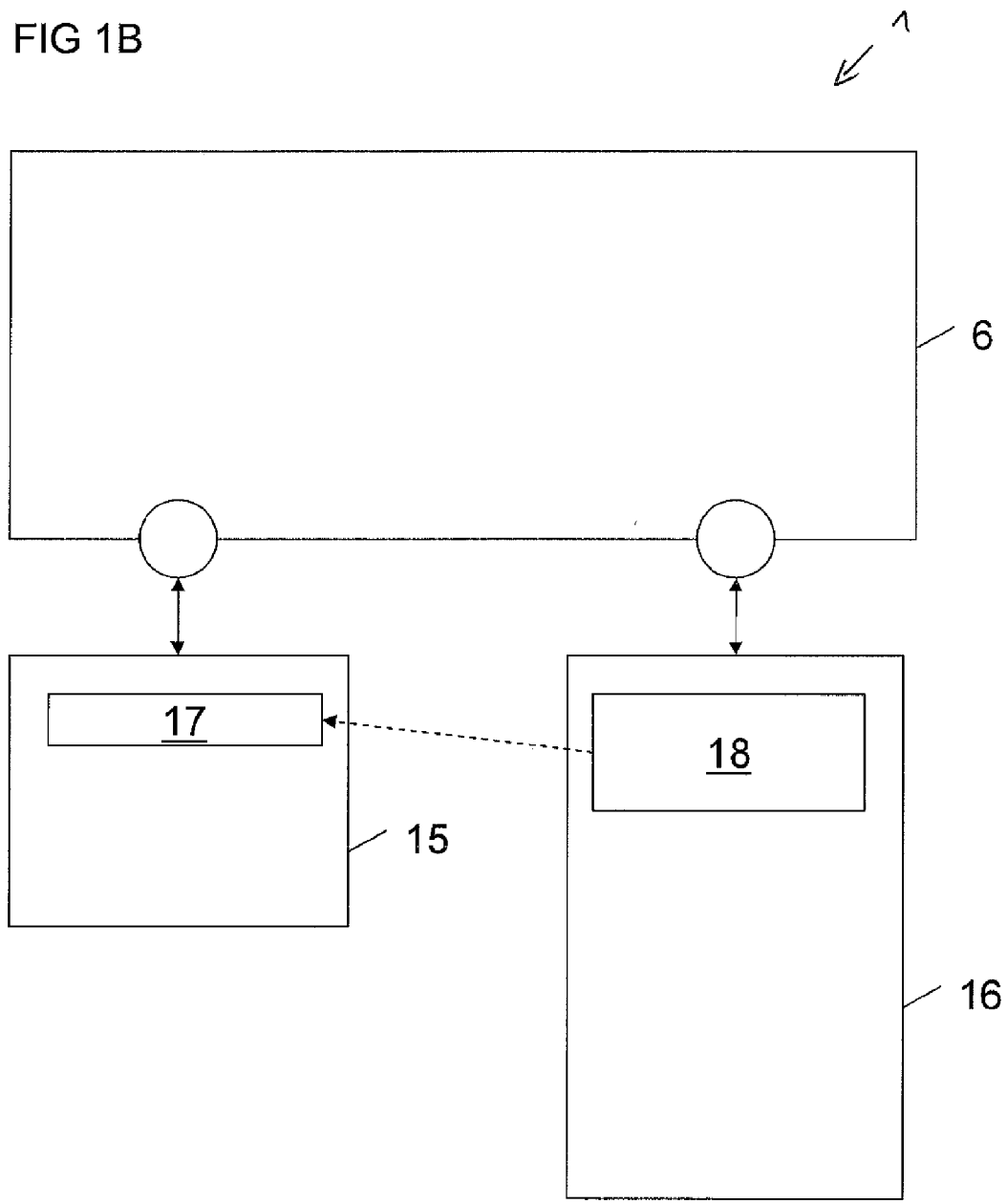

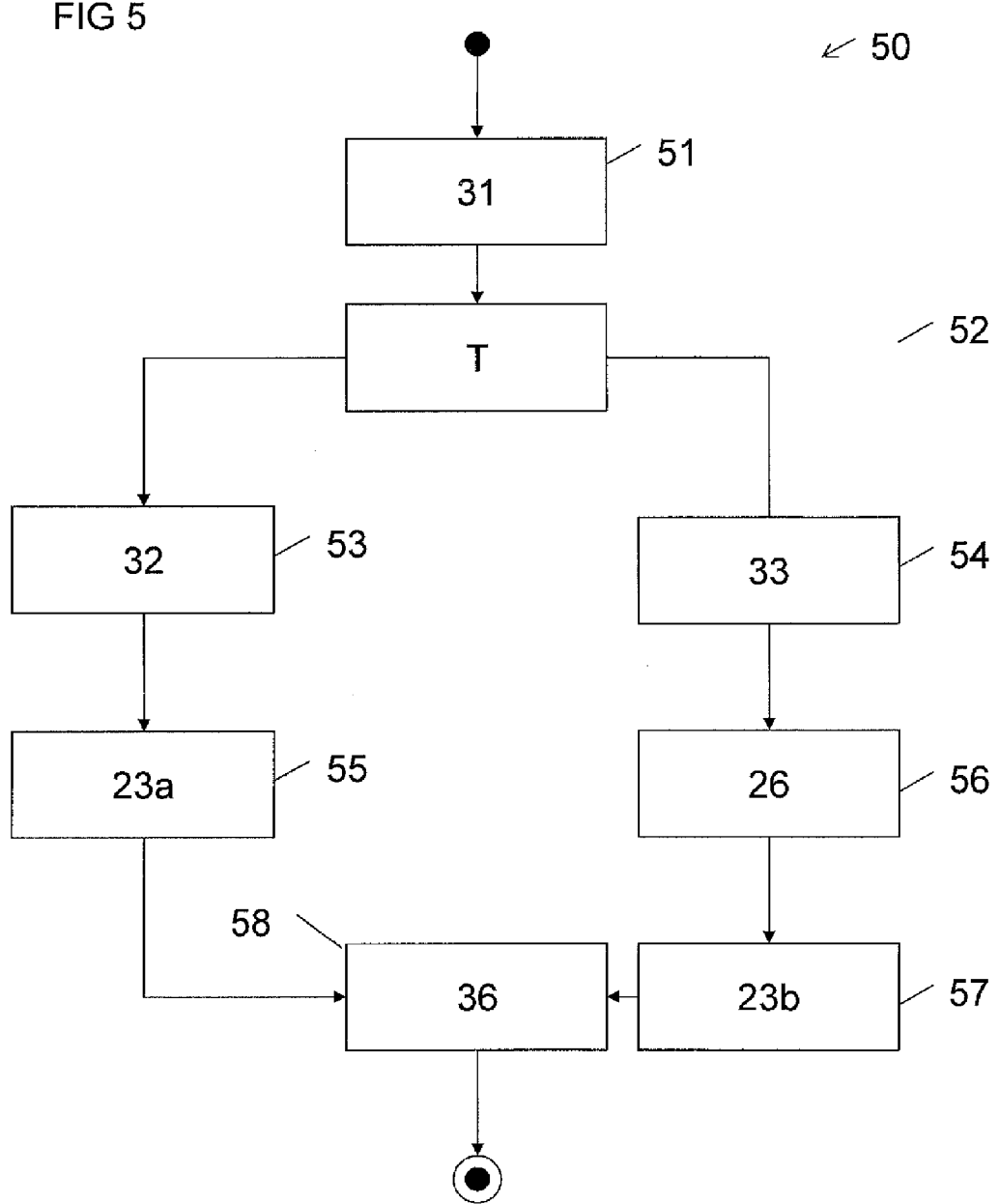

OPERATING METHOD FOR A MEMORY SUBSYSTEM AND DEVICES FOR EXECUTING THE OPERATING METHOD

This application claims priority to German Patent Application 10 2008 022 831.1, which was filed May 8, 2008 and is incorporated herein by reference.

TECHNICAL FIELD

Embodiments of the invention relate to an operating method for a memory subsystem having at least one first mass memory, a second mass memory, and a control unit for controlling the first mass memory and the second mass memory. In addition, the application relates to a memory subsystem having at least one interface, at least one first mass memory, at least one second mass memory, and a control unit, as well as a control unit for such a memory subsystem and a computer program product.

BACKGROUND

Memory subsystems with several mass memories are known, such as, so-called RAID systems (redundant array of independent disks). They are used especially in server systems in which the data processing unit and the memory subsystem are often separated from each other. Especially for very powerful server systems, for example, so-called server farms, the memory subsystems often limit the performance of the overall system. For example, so-called streaming applications in which a server processes large amounts of data sequentially require especially short access times and high data transfer rates and storage capacities.

From the state of the art, different mass memories are known. Mass memory systems with at least one moving read/write head or moving storage medium, for example, magnetic, magneto-optical, or optical hard drives, are relatively widespread. Such hard drives are characterized by very high data capacities and densities and are relatively economical in production. Especially through a logical connection of several such drives, relatively simple mass memories with a few terabytes of storage capacity can be constructed. Mass memories with moving read/write heads or memory media, however, feature the disadvantage that the moving part must first be positioned before the data access, which currently causes an access delay of several milliseconds. Thus, such mass memories are not suitable for use with applications that place very high demands on access times, especially so-called real-time applications.

In addition, solid-state memory media are known from the prior art. For example, so-called solid-state disks (SSD) use a plurality of semiconductor memory components to store data. Here, in particular, non-volatile EPROM components or battery-buffered RAM components are used. Such solid-state memory media are characterized by very high access speeds, since each of the included memory cells can be directly accessed. Currently, access times in the range of a few nanoseconds are possible. Such solid-state memory media, however, feature the disadvantage that they are relatively expensive and feature a comparatively low memory density and capacity. Therefore, they are not suitable for storing very voluminous data, for example, in the range of several hundred gigabytes.

SUMMARY

In one aspect, the present invention discloses an operating method for a memory subsystem that simultaneously features a high access speed and high data transfer rates and capacities. For example, such an operating method should be suitable for use with real-time and streaming applications. In addition, devices are described that are designed for executing the operating method.

According to a first embodiment of the invention, an operating method is described for a memory subsystem having at least one first mass memory with a solid-state memory medium, at least one second mass memory with a moving read/write head or moving memory medium, and at least one control unit for controlling the first mass memory and the second mass memory.

In the operating method, a request for storing or reading data is received, wherein the request has at least one set of address information. A first memory region is defined on the first mass memory based on the address information and a second memory region is defined on the second mass memory based on the address information. A first subrequest with respect to the first memory region is transmitted to the first mass memory and, simultaneously a second subrequest with respect to the second memory region is transmitted to the second mass memory.

According to an embodiment, the advantages of a first mass memory with a solid-state memory medium and a second mass memory with a moving read/write head or a moving memory medium are combined. To simultaneously achieve a high access speed and a large data capacity, a request for storing or reading data is divided into first and second subrequests, with these subrequests being sent to the two mass memories. In this way, the first part of a request can be processed by the solid-state memory medium with a fast access time, while the second part of the request is processed by a mass memory with a moving read/write head or moving memory medium.

According to an advantageous embodiment, a size of the first memory region is defined essentially by an expected delay for executing the second subrequest. By defining the expected delay and adapting the size of the first memory region to this delay, the required memory capacity of the first mass memory can be minimized, without resulting in access delays in the access to the memory subsystem.

According to another advantageous embodiment, the expected delay is defined as a function of a position of the second memory region on the second mass memory. Mass memories with moving parts normally feature different access speeds for different positions of an addressed memory region. Because the position of the second memory region is considered in defining the delay, the required memory region on the first mass memory can be further reduced.

According to another advantageous embodiment, for a request for reading data, initially a first subresponse of the first mass memory to the first subrequest and then a second subresponse of the second mass memory to the second subrequest are received by the control unit and combined into a common response of the control unit. By combining the first and second subresponses by the control unit, the memory subsystem appears on the outside to behave like a single mass memory.

According to another advantageous embodiment, for a request for writing data, with the first subrequest, data is transmitted in the extent of the first size to the first mass memory, and with the second subrequest, subsequent data is transmitted to the second mass memory. By dividing a write request into first and second data sets, only the data that arrives before the second mass memory is ready to record; subsequent data is stored on the first mass memory.

According to another advantageous embodiment, the data to be written is initially written by the control unit in a buffer memory of the control unit, the data in the buffer memory is divided into a first data block with the first size and at least one second data block with a second size, and after receiving the first and the second data blocks, the first subrequest with the first block is transmitted to the first mass memory and the second subrequest with the second data block is simultaneously transmitted to the second mass memory. By buffering and dividing the data to be written in a buffer memory of the control unit, a write request can be processed even more quickly and transparently to the outside.

According to another advantageous embodiment, after the execution of the second subrequest by the second mass memory, the data of the first subrequest is also transmitted with a third subrequest to the second mass memory. By transmitting a third subrequest equivalent to the first subrequest to the second mass memory, the consistency of the stored data of the second mass memory can be guaranteed even for the loss of the first mass memory.

Various embodiments combine advantages of an SSD- or NV-RAM-based memory medium with respect to the file access times during reading and writing with a very high data capacity established on the basis of economical mass data memory media, e.g., hard drives. The advantages are independent of system size and system configuration.

The delay times of the addressed memory media resulting from the system and mass memory properties are bridged by means of the amount of pre-stored data in the fast SSD/NV-RAM memory media. Through a corresponding configuration of the memory subsystem, e.g., in the form of a RAIDO data carrier network, except for a constant access time, one can also adjust the usable data transmission speed.

BRIEF DESCRIPTION OF THE DRAWINGS

Embodiments of the invention will be explained in greater detail below with reference to the figures. Here, the same reference symbols will be used in the figures described below for parts with the same or similar function. In the drawings:

FIG. 1B shows a schematic diagram of a memory subsystem having a first mass memory, a second mass memory, and a control unit;

FIG. 5 shows a flow chart of a method for reading data.

Figure 1A:
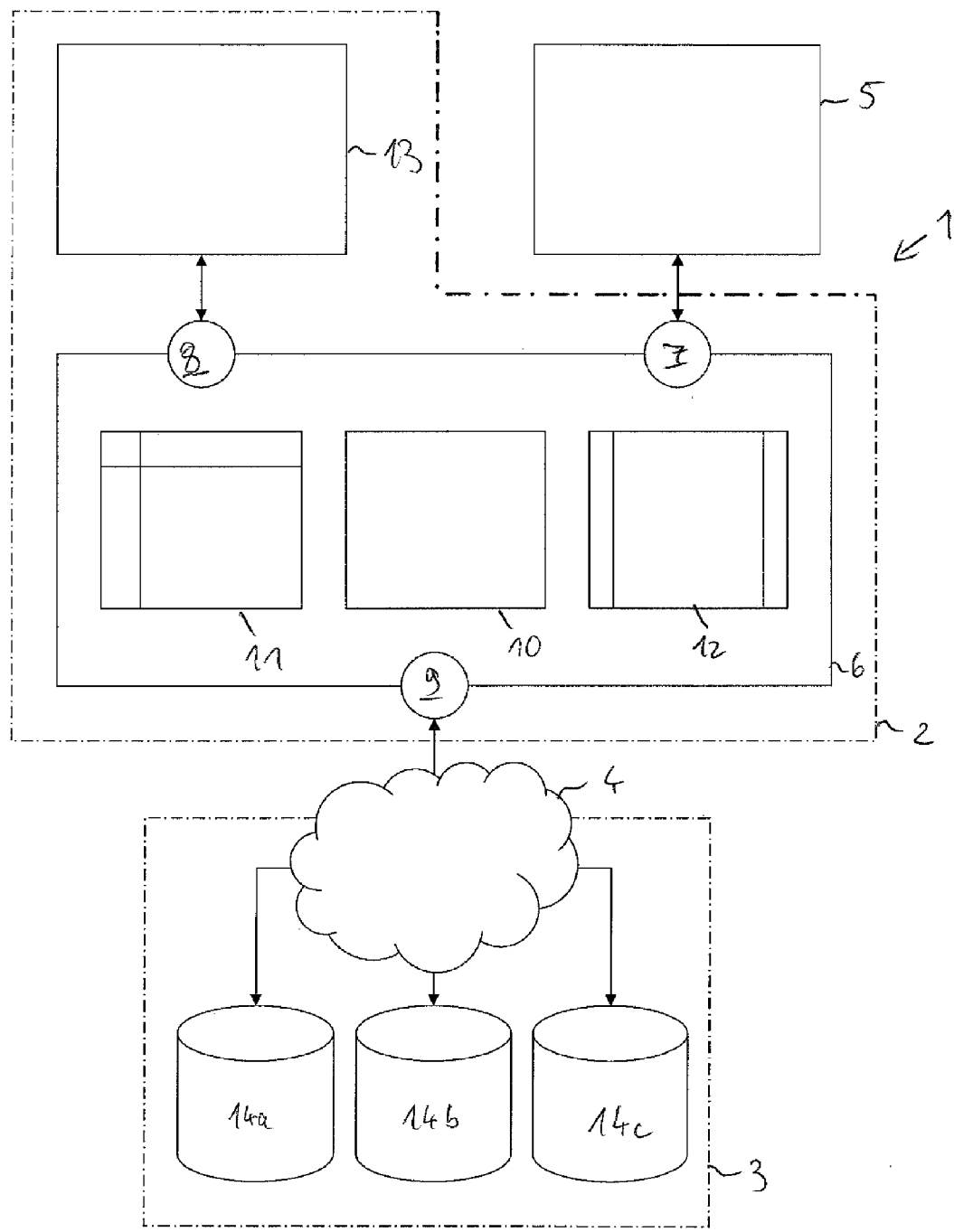
FIG. 1A shows a memory subsystem with a first RAID system and a second RAID system.

The following list of reference symbols can be used in conjunction with the drawings:

1 Memory subsystem
2 First RAID system
3 Second RAID system
4 Data network
5 Server computer
6 Control unit
7 First interface
8 Second interface
9 Third interface
10 Microprocessor
11 Work memory
12 Buffer memory
13 Solid-state memory
14 Hard drive
15 First mass memory
16 Second mass memory
17 First memory region
18 Second memory region
21 Write request
22 Data stream
23a First part
23b Second part
24 First subrequest
25 Second subrequest
26 Delay
27 Third subrequest
28 Acknowledge message
29 Request
31 Read request
32 First subrequest
33 Second subrequest
34 First subresponse
35 Second subresponse
36 Response
37 Error message
40 Method for writing a data stream
41 to 49 Method steps
50 Method for reading a data stream
51 to 58 Method steps

DETAILED DESCRIPTION OF THE DRAWINGS

FIG. 1A shows a memory subsystem 1. The memory subsystem 1 includes a first RAID system 2 and a second RAID system 3. The first RAID system 2 and the second RAID system 3 are coupled to each other by means of a data network 4. For example, the first RAID system 2 can involve a local memory component arranged in a server rack. The second RAID system 3 can involve, for example, a remotely mounted network drive, also known as "Network Attached Storage" (NAS). The first and the second RAID systems 2 and 3, respectively, can be coupled to each other, for example, by means of a fiber-channel network.

In addition, a server computer 5 that is used for processing data is connected to the memory subsystem 1. For this purpose, the server computer 5 accesses the data of the memory subsystem 1. The first RAID system 2 includes a control unit 6 having an interface 7 for connecting the memory subsystem 1 to the server computer 5, a second interface 8 for connecting local mass memory 13 and a third interface 9 for connecting remote mass memory via the data network 4. In addition, the control unit 6 includes a microcontroller or microprocessor 10, a work memory 11, and a cache or buffer memory 12. Clearly, the work memory 11 and the buffer memory 12 could be realized as regions of a single memory. For better representation of the different functions, however, they are shown as separate units in FIG. 1A.

In the embodiment, a solid-state memory medium 13 is connected to the second interface 8. For example, here it involves a so-called solid-state disk (SSD) with flash EEPROM components with a total memory capacity from several gigabytes up to a few hundred gigabytes, for example, 100 GB. In the embodiment, the solid-state memory medium 13 is directly connected to the interface 8, that is, without connecting active components, such as a port expander, a buffer memory, or similar components between. A suitable interface for connecting the solid-state memory medium 13 to the control unit 6 is, for example, a local serial ATA (SATA) interface or a Serial Attached SCSI (SAS) interface.

The second RAID system 3 includes three hard drives 14a, 14b, and 14c. The hard drives 14a to 14c each have, for example, a stack of rotating memory media each with a total memory capacity of one terabyte. Suitable devices for connecting the hard drives 14a to 14c to the control unit 6, in addition to local connection interfaces, are also buffered or cascaded transmission devices, for example, so-called port expanders.

As an alternative to the system architecture shown in FIG. 1A, the memory subsystem 1 may also include an individual RAID system or an individual controller with two connected mass memories. The use of different controllers is also possible, each controller connected to a mass memory, if these are controlled by common software, for example, in the form of a driver.

FIG. 1B shows a simplified schematic diagram of the memory subsystem 1 having a common control unit 6, a first mass memory 15, for example, a solid-state memory medium 13, and a second mass memory 16, for example, a hard drive 14. The first mass memory 15 has a first memory region 17 and the second mass memory 16 has a second memory region 18. Here, the first memory region 17 is allocated logically to the second memory region 18 by the control unit as described below.

For preparing write and read accesses to the memory subsystem 1, in the described embodiment, the maximum access times and data transmission rates of the individual mass memories are initially determined.

During an initialization phase, the worst possible access times $T_{access}$ for reading and/or writing to all of the mass memories and across the entire memory region of the control unit 6 are determined. All of the factors that delay data access are taken into account, e.g., also the influence of intermediate buffer devices, e.g., SAS expanders, FC switches, iSCSI devices, or others. The other delay factors include, e.g., delays caused by "on-the-fly" active encryption, decryption, data recoding, SAS-time-division multiplexing, or others. For different data media types, especially for the hard drives 14, so-called "full-stroke" access times (most unfavorable positioning time) must also be determined. Preferably, this operation should be executed across the entire configuration for each mass memory device. In addition, with each mass memory device newly coupled to the memory subsystem 1, the active access time can be determined for its memory region.

In the activated energy-saving mode of the mass memory, the control unit 6 determines the device activation times $T_{wakeup}$ for the currently used energy-saving mode. The specifications here list, as a rule, only the maximum access times and wakeup times.

As a result of this initialization phase, the access times $T_{access}$ and $T_{wakeup}$ to the device block addresses or block address regions of the individual mass memories are determined.

In another, optional, phase, the data transmission speeds of the first and second mass memories 15 and 16 are determined. For memory media, for example, the hard drives 14, rotating at a constant angular velocity, the minimum sequential data transmission speeds $V_{DSeq}$ for the corresponding address regions of each mass memory medium are determined.

Based on the data obtained in the initialization phase, an address allocation can be performed during subsequent operations.

With each new data access to the memory region 18 of the second mass memory 16, a mapping of the address in the first mass memory 15 is automatically created, and the length of the reserved region 17 is automatically calculated. The minimum length DP1 of the region 17 reserved in the first mass memory 15 is given from the following formula:

$$DP1 = V_{DSeq} \times (T_{access} + T_{wakeup})$$

Wherein examples include:

$V_{DSeq}$=50 MB/s, $T_{access}$=10 ms, $T_{wakeup}$=10 ms->DP1=1 MB $V_{DSeq}$=200 MB/s, $T_{access}$=5 ms, $T_{wakeup}$=10 ms->DP1=3 MB In the described embodiment, a table with the associated (start of file) addresses of the first and the second mass memories 15 and 16 is stored by the control unit 6 on the first mass memory, and stored, after a system start, preferably in a separate memory region, for example, the work memory 11, accessible to the control unit 6.

The data accesses to the second mass memory 16 are always performed with the data transmission rate $V_{DSeq}$ determined for the second mass memory 16.

For systems with restricted management possibilities with respect to reaction times of the first mass memory device 15 for read or write cycles, the length DP1 of the reserved region 17 should always be able to bridge a maximum access time. This means that there is excess data in the defined region 17 of the first mass memory 15 at the expense of the first mass memory 15. It is to be considered an advantage in this solution that the second mass memory 16 reports its readiness during all accesses to the first mass memory 15. The data accesses are switched continuously, that is, without delay times, from the first region 17 of the first mass memory 15 to the second region 18 of the second mass memory 16.

Figure 2A:
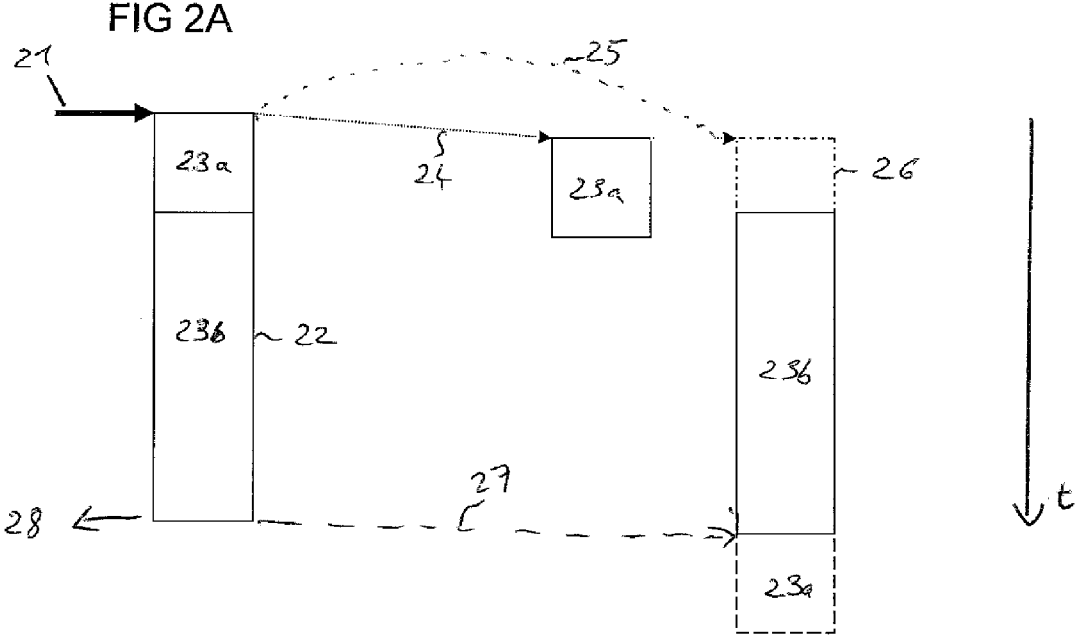
FIG. 2A shows a schematic diagram of a write access without use of a buffer memory.

FIG. 2A shows a schematic diagram of a write operation in the memory subsystem 1 without using a buffer memory 12. A write request 21 is directed to the control unit 6 of the memory subsystem 1. For example, a server computer 5 can generate a new data stream 22 or can change an existing data stream.

The data stream 22 that is to be stored with the write request 21 in the memory subsystem 1 is divided by the control unit 6 into a first part 23a and a second part 23b. The first part 23a is transmitted with a first subrequest 24 to the solid-state memory medium 13, that is, the first mass memory 15. Because the solid-state memory medium 13 contains no moving parts, the first part request 24 is processed with nearly no time delay with respect to the original write request 21 by the solid-state memory 13.

Simultaneously with the first subrequest 24, a second subrequest 25 with respect to the second part 23b is transmitted to a hard drive 14, that is, the second mass memory 16. With the second subrequest 25, the second part 23b of the data stream 22 is transmitted for writing to the hard drive 14. After an initial delay 26, the second part 23b is then written to the hard drive 14. In a subsequent, optional, step, with a third subrequest 27, the first part 23a of the data stream 22 is also written to the hard drive 14.

The diagram according to FIG. 2A attempts to illustrate the time sequence of the individual subrequests 24, 25, and 27. Here, events that appear farther below in FIG. 2A are performed later in time. In contrast, however, no information about the spatial arrangement of the first and second parts 23a and 23b of the data stream 22 in the first mass memory and the second mass memory, respectively, is to be taken from FIG. 2A.

In particular, it is advantageous to arrange the first part 23a of the data stream 22 spatially in front of the second part 23b on the hard drive 14. Therefore, if necessary, a new positioning of a read/write head of the hard drive 14 is required between the second subrequest 25 and the third subrequest 27.

The write request 21 can be acknowledged with an acknowledge message 28 with respect to the server computer 5 before the execution of the third subrequest 27, because at this time, the entire data stream 22 has already been stored in the memory subsystem 2.

In the case of a break in the stream during the writing, the data of the first part 23a is present in the first mass memory 15. Thus, it can be written back to the second mass memory 16 at any time. The corresponding status information, e.g., a so-called "dirty" bit for the first memory region 17, is stored by means of this process before each write cycle in the corresponding memory region 17, and reset after a successful write cycle.

The writing speed of the data, also to the first mass memory 15, complies with the determined data transmission speed $V_{DSeq}$ of the second mass memory 16, in order to keep the data stream 22 constant and to avoid unnecessary load jumps on the control unit, including possible activation of energy-saving modes or data losses. With respect to higher software layers, for example, application programs, the data transfer is performed at a constant rate.

Likewise, it is shown in FIG. 2A that the second subrequest 25 could possibly be performed before the completion of the first subrequest 24, for example, when the actual delay of the hard drive 14 takes less than initially assumed. Both an overlap in time and content are possible while the first part 23a and the second part 23b are written.

Figure 2B:
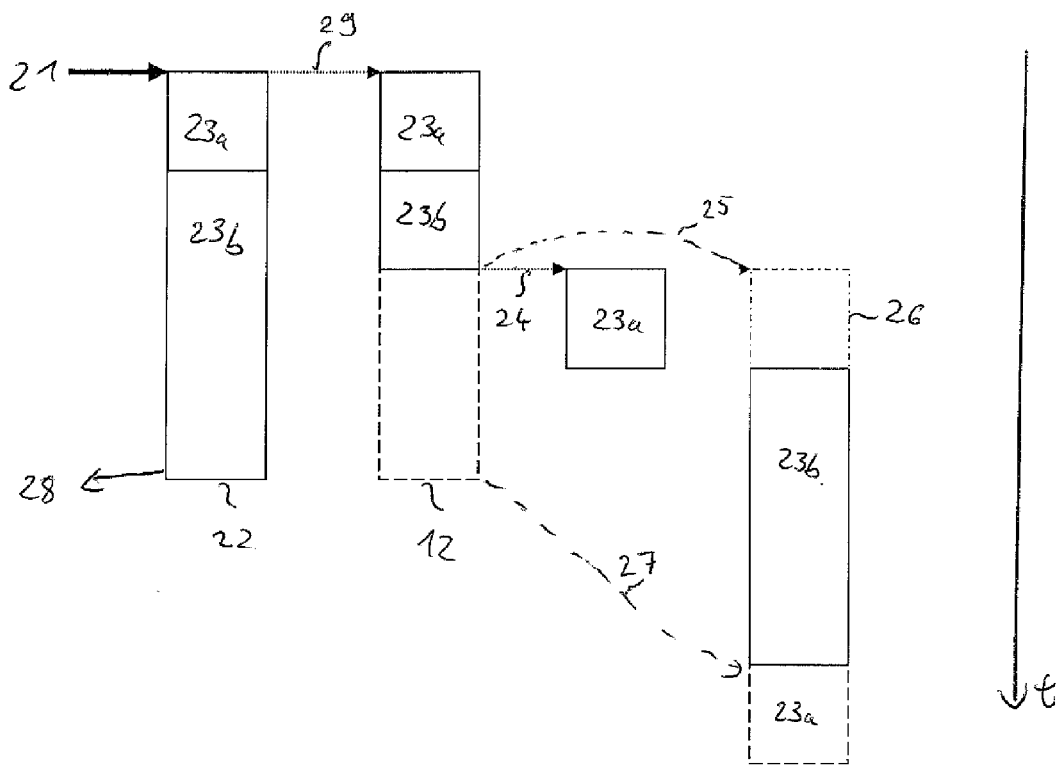
FIG. 2B shows a schematic diagram of a write access using a buffer memory.

FIG. 2B shows an alternative embodiment of a write method using a buffer memory 12. A write request 21 for writing a data stream 22 with a first part 23a and a second part 23b is initially written completely by means of a request 29 in an especially fast buffer memory 12 of the control unit 6. As soon as the first part 23a and at least one block of the second part 23b are contained in the buffer memory 12, a first subrequest 24 with respect to the first part 23a is started and a second subrequest 25 with respect to the second part 23b is started. The first subrequest 24 is directed toward the first mass memory 15 with the solid-state memory medium 13. The second subrequest 25 is directed toward the second mass memory 16 with the hard drive 14 and performed only after a delay 26 of the hard drive 14. Then, additional blocks of the second part 23b and, as described above, also the first part 23a of the data stream 22 with a third subrequest 27 can be transmitted to the hard drive 14.

In the embodiment shown in FIG. 2B, the request 21 is acknowledged with an acknowledge message 28 as soon as the last part of the data stream 22 has been stored in the buffer memory 12, that is, before all of the data of the first and second parts 23a and 23b have been written to one of the two mass memories 15 and 16. In order to guarantee the consistency of the mass memory subsystem 1 even for a loss of power or a similar exceptional state, in an advantageous embodiment, the control unit 6, or at least one of the buffer memories 12, has an energy buffer that powers the control unit 6 until the data stored in the buffer memory 12 have been permanently backed up or until the power supply is supplied again.

In order to keep all of the data coherent during the execution of the write request 21, in an advantageous embodiment, any cache memories of the mass memories 15 and 16 are deactivated.

As shown in FIG. 2B, the first subrequest 24 and the second subrequest 25 are executed one directly after the other, which leads to no overlap of the respective write operations. This is guaranteed in that the delay 26 of the hard drive 14 is determined, for example, as described above, with respect to a memory address contained in the write request 21.

Figure 3A:
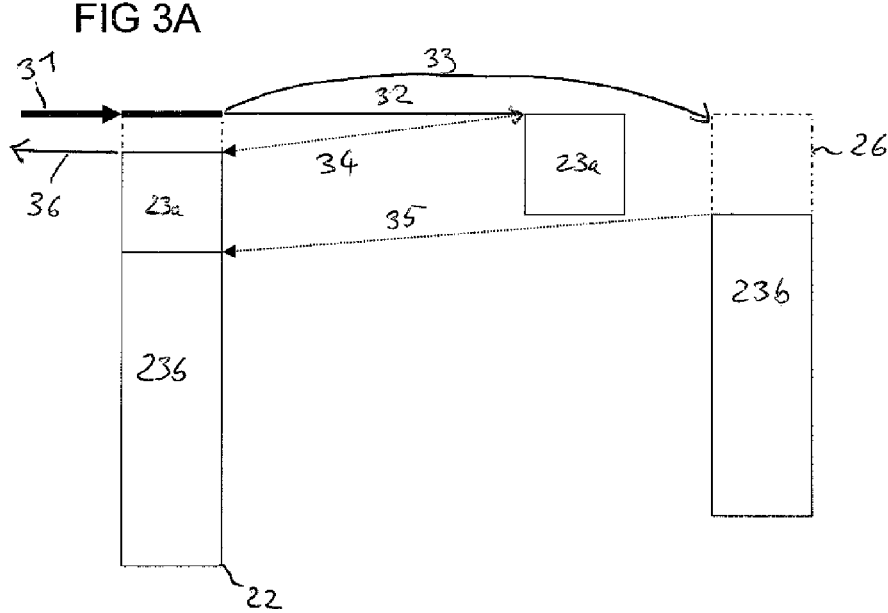
FIG. 3A shows a schematic diagram of a read access.

FIG. 3A shows the schematic diagram of a read operation. A read request 31 for reading a data stream 22 is divided by the control unit 6 initially into a first subrequest 32 to the first mass memory 15 with the solid-state memory medium 13 and a second subrequest 33 to the second mass memory 16 with the hard drive 14. The solid-state memory medium 13 begins with the transmission of a first subresponse 34 immediately. The first subresponse 34 contains a first part 23a of the requested data stream 22. The second subrequest 33 is processed only after a delay 26 of the hard drive 14. After successful positioning of a read head in the region 18 of the requested data stream 22, its second part 23b is transmitted with a second subresponse 35 back to the control unit 6. The control unit 6 combines the first part 23a and the second part 23b into a common response 36. Because the first part 23a of the response 36 takes place with only minimum delay for the control unit 6, the control unit 6 can begin to transmit the response 36 back to a server computer 5 immediately after the read request 31.

Figure 3B:
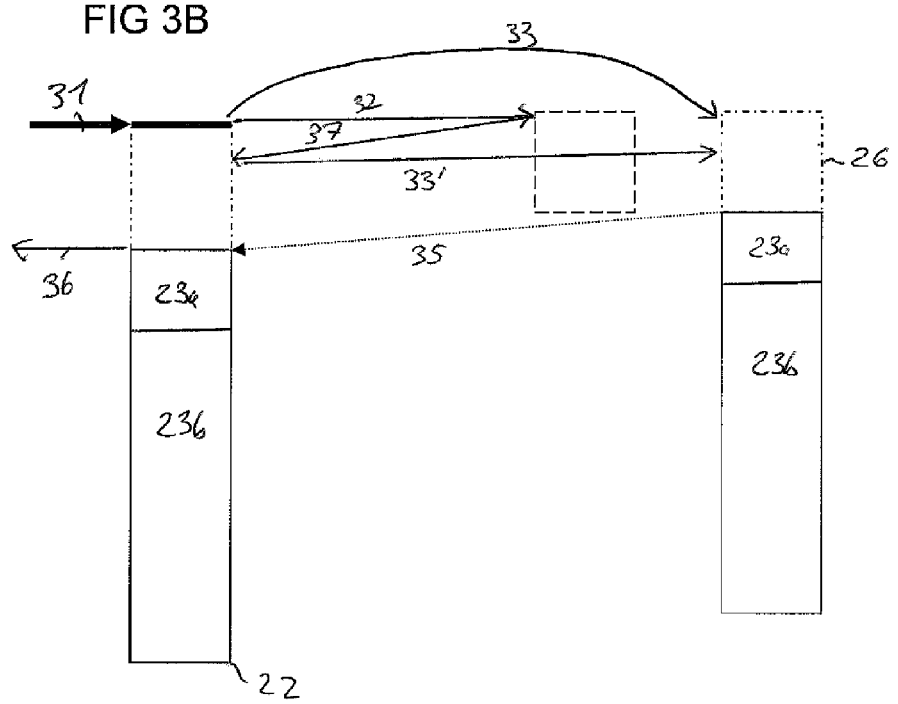
FIG. 3B shows a schematic diagram of a read access in which the data to be read is recalled completely from the second mass memory.

FIG. 3B shows an alternative sequence of the read request 31. Initially, the read request 31 is again divided into a first subrequest 32 to the first mass memory 15 and a second subrequest 33 to the second mass memory 16. In the embodiment shown, however, the first part 23a of the data stream 22 is not stored in the solid-state memory medium 13. For example, the data stream 22 was not stored using one of the write operations shown in FIG. 2A or 2B. Alternatively, it is also possible that a first part 23a of a data stream 22 that was initially stored in the first region 17 of the first mass memory 15 is damaged or has become unusable due to another operation. In this case, the first mass memory 15 reports an error message 37 back to the control unit 6. By means of a modified subrequest 33', the control unit 6 then requests the entire data stream 22, with the first part 23a and the second part 23b, from the second mass memory 16. Then, after an initial delay 26, the hard drive 14 transmits the entire data stream 22 back to the control unit 6 that transmits this by means of a response 36 back to the server computer 5. Here, the delay between the read request 31 and the beginning of the response 36 approximately equals the normal delay 26 of the second mass memory 16.

Figure 4:
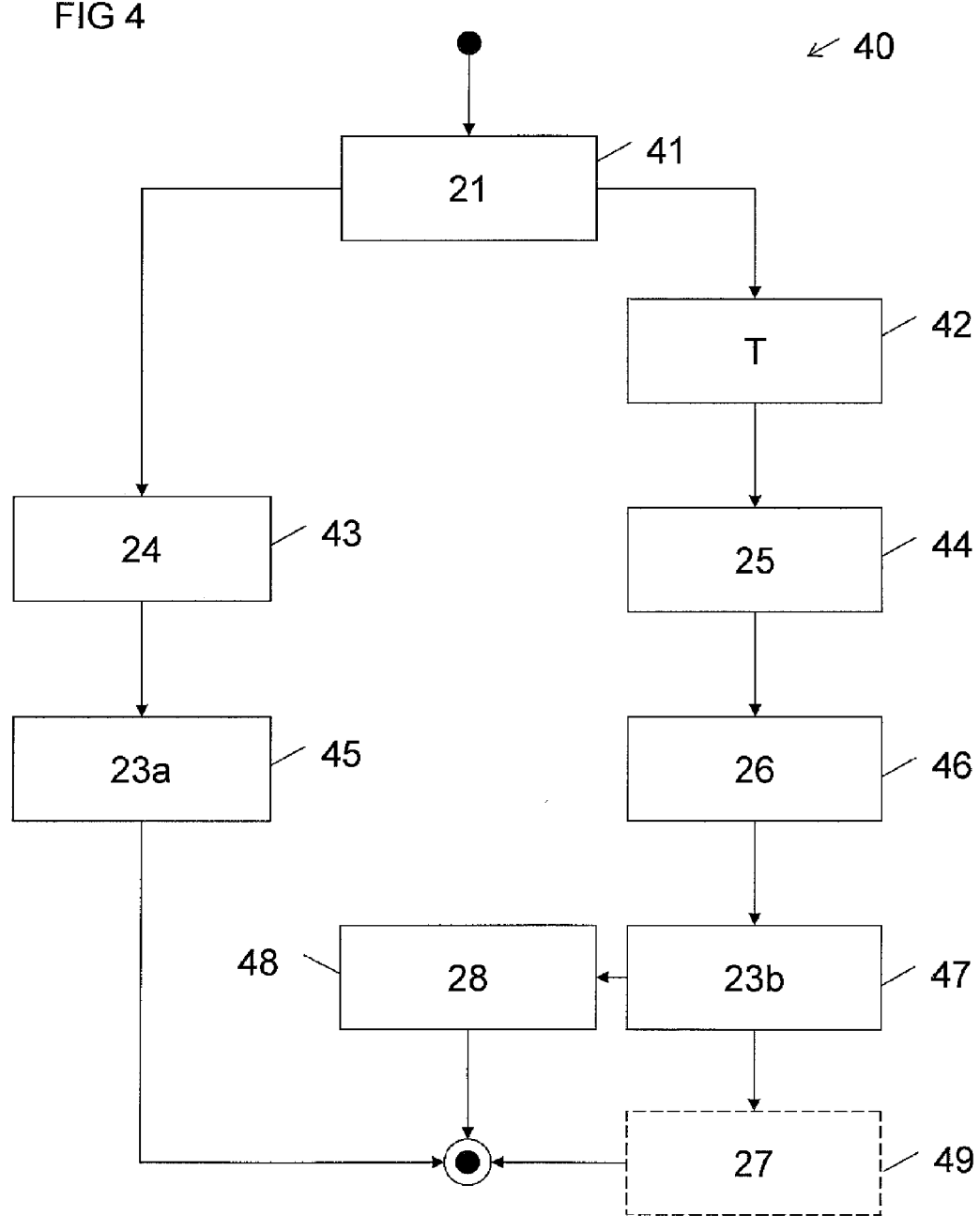
FIG. 4 shows a flow chart of a method for writing data.

FIG. 4 shows a schematic flow chart of a method for writing data into the memory subsystem 1. In a first step 41, a write request 21 is received by the first interface 7 of the control unit 6. The write request 21 contains address information that specifies an address of the data to be stored in the memory subsystem 1. Starting from this address information, for example, a block number, the control unit 6 defines corresponding memory regions 17 and 18 of the first mass memory 15 and the second mass memory 16. For example, the data could be stored on a corresponding address of the second mass memory 16, while the next free memory region 17 of the first mass memory 15 is defined for storing the first part 23a. The first and second memory regions 17 and 18 defined in this way, or their starting addresses, are stored, for example, in the work memory 11 of the control unit 6 and are made available for subsequent write and read requests.

In another step 42, an expected delay of the second mass memory 16, for example, the hard drive 14, is determined. The determined delay time T is combined, for example, as described above, from an access delay $T_{access}$ and a start delay $T_{wakeup}$. The access delay $T_{access}$ designates the time that is needed to position a read/write head at the beginning of the requested memory region. The activation time $T_{wakeup}$ designates the time that is needed to set the hard drive 14 into a ready-to-operate state. For example, before the write request 21, the hard drive 14 could be placed in a so-called sleep or energy-saving state in which the rotating memory media does not rotate at full speed or at all.

If the access delay T was defined for the access to the second mass memory 16, starting from this access delay T and a data transfer rate $V_{DSeq}$ of the memory subsystem or the server computer 5, the size of the first part 23a can be calculated. For example, if the data transfer rate equals 50 MB/s, the access time $T_{access}$ equals 10 ms, and the activation time $T_{wakeup}$ equals 10 ms, then the size of the first part 23a equals one megabyte.

In a step 43, the first part 23a of the data stream 22 is then transmitted with a size of, for example, one megabyte to the first mass memory 15. In parallel, in step 44, the second part 23b of the data stream 22 is transmitted to the second mass memory 16.

The first mass memory 15 begins in step 45 immediately with the write access and thus the storage of the first part 23a. Meanwhile, a read/write head of the hard drive 14 is positioned in a step 46 at the beginning of the second memory region 18. In a subsequent step 47, the additional data 23b of the data stream 22 are written to the second mass memory 16.

After completion of the write operations 45 and 47, in a step 48, the control unit 6 acknowledges the execution of the write request 21. In an optional step 49, the first part 23a of the data stream 22 can still be subsequently written to the hard drive 14.

FIG. 5 shows a flow chart of a method for reading data from a memory subsystem 1. In a first step 51, a read request 31 is received from the control unit 6. The read request 31 contains address information characterizing the data stream 22 to be read. The control unit 6 allocates the address information to first and second memory regions 17 and 18 of the first and second mass memories 15 and 16, respectively. For example, the necessary information could be retrieved from the work memory 11 by the microprocessor 10.

In a step 52, the size of the first part 23a of the data stream 22 is defined. For this purpose, for example, as described with reference to step 42, a delay T of the second memory 16 could be defined for the defined second address region 18. Alternatively, it is also possible to retrieve metadata that is generated during the writing of the data stream 22 and that has the length of the first part 23a.

In steps 53 and 54, a first subrequest 32 and a second subrequest 33 are respectively transmitted to the first mass memory 15 and the second mass memory 16. The first mass memory 15 that involves a solid-state memory medium 13 immediately begins with the reading of the requested first part 23a and delivers corresponding data with a first subresponse 34 back to the control unit 6. Meanwhile, the second mass memory 16, for example, the hard drive 14, positions read heads in the second memory region 18. This is performed in step 54. In a subsequent step 46, the second part 23b of the data stream 22 is read from the hard drive 14. The first subresponse 34 and second subresponse 35 transmitted back in steps 55 and 57 from the first and second mass memories 15 and 16, respectively, are assembled in a step 58 by the control unit 6 into a single response 36 and transmitted to a requesting server computer 5.

Here, the second part 23b is available for transmission immediately after the first part 23a, if the delay T is defined as described above and the data stream 22 can be transmitted practically without time delay to the requesting server computer 5. If the transmission of the first part 23a or the second part 23b is extremely delayed, then the control unit 6 logs the delay that has occurred and optionally takes it into account in subsequent write operations in the relevant memory region. For example, if it is determined during the operation of the memory subsystem 1 that one of the three hard drives 14a, 14b, or 14c has a greater access time than the other two hard drives 14, this can be taken into account in the writing and reading of data to and from the relevant hard drive. For example, if the hard drive 14c has a 20% greater access delay than the hard disks 14a and 14b, the first memory regions 17 allocated to the hard disk 14c on the first mass memory 15 of the solid-state memory medium 13 could be increased by 20%, in order to buffer the occurring delays and to hide these delays with respect to the requesting server computer 5.

What is claimed is:

1. A method for a memory subsystem having at least one first mass memory with a solid-state memory medium, at least one second mass memory with a moving read/write head or moving memory medium, and at least one control unit for controlling the first mass memory and the second mass memory, the method comprising:

receiving a request for storing or reading data, wherein the request has at least one set of address information;

defining a first memory region on the first mass memory based on the address information;

defining a second memory region on the second mass memory based on the address information;

transmitting a first subrequest with respect to the first memory region to the first mass memory; and simultaneously transmitting a second subrequest with respect to the second memory region to the second mass memory, wherein a size of the first memory region is defined essentially by an expected delay when executing the second subrequest.

2. The method according to claim 1, wherein the expected delay is defined as a function of a position of the second memory region in the second mass memory.

3. The method according to claim 1, wherein, for a request for reading data, a first subresponse of the first mass memory to the first subrequest is initially received and then a second subresponse of the second mass memory to the second subrequest is received by the control unit and combined to form one common response of the control unit.

4. A method for a memory subsystem having at least one first mass memory with a solid-state memory medium, at least one second mass memory with a moving read/write head or moving memory medium, and at least one control unit for controlling the first mass memory and the second mass memory, the method comprising:

receiving a request for writing data, wherein the request has at least one set of address information;

defining a first memory region on the first mass memory based on the address information;

defining a second memory region on the second mass memory based on the address information;

transmitting a first subrequest comprising data in the extent of a first size with respect to the first memory region to the first mass memory; and simultaneously transmitting a second subrequest comprising subsequent data with respect to the second memory region to the second mass memory.

5. The method according to claim 4, wherein a size of the first memory region is defined essentially by an expected delay when executing the second subrequest.

6. The method according to claim 4, wherein the data to be written by the control unit are initially written to a buffer memory of the control unit, the data in the buffer memory being divided into a first data block with the first size and at least one second data block with a second size and, after receiving the first and second data blocks, the first subrequest with the first data block is transmitted to the first mass memory and the second subrequest with the second data block is simultaneously transmitted to the second mass memory.

7. The method according to claim 4, wherein, after executing the second subrequest by the second mass memory, the data of the first subrequest is also transmitted with a third subrequest to the second mass memory.

8. A computer programming product with a memory medium for storing an executable program code, the memory medium comprising a program memory for a microprocessor or microcontroller of a memory subsystem having at least one first mass memory with a solid-state memory medium, at least one second mass memory with a moving read/write head or moving memory medium, and at least one control unit for controlling the first mass memory and the second mass memory, wherein, for execution by the control unit of the memory subsystem, the program code is configured to:
receive a request for storing or reading data, wherein the request has at least one set of address information;
define a first memory region on the first mass memory based on the address information;
define a second memory region on the second mass memory based on the address information;
transmit a first subrequest with respect to the first memory region to the first mass memory; and
simultaneously transmit a second subrequest with respect to the second memory region to the second mass memory.

9. A memory subsystem comprising:
an interface for connecting to a computer system;
a first mass memory with a solid-state memory medium;
a second mass memory with a moving read/write head or memory medium;
a further memory for storing a translation table; and
a control unit for controlling the first mass memory and the second mass memory, wherein the control unit is configured to receive a request for storing or reading data with at least one set of address information from the interface, to define a first memory region in the first mass memory based on the address information, to define a second memory region in the second mass memory based on the address information, to transmit a first subrequest with respect to the first memory region to the first mass memory, and to simultaneously transmit a second subrequest with respect to the second memory region to the second mass memory, wherein the translation table stores address information and/or a first size of the first memory region.

10. The memory subsystem according to claim 9, further comprising a buffer memory for buffering data for the first and/or the second subrequest.

11. The memory subsystem according to claim 10, wherein the buffer memory and the further memory are implemented in the same physical memory.

12. A control unit for a memory subsystem, the control unit comprising a memory for storing a translation table and a processing device for executing program code, the program code causing the control unit to:
receive a request for storing or reading data, wherein the request has at least one set of address information;
define a first memory region on a first mass memory based on the address information;
define a second memory region on a second mass memory based on the address information;
transmit a first subrequest with respect to the first memory region to the first mass memory, wherein the translation table stores address information and/or a first size of the first memory region; and
simultaneously transmit a second subrequest with respect to the second memory region to the second mass memory.

13. The control unit according to claim 12, wherein the processing device comprises a microprocessor.

14. The control unit according to claim 12, further comprising a buffer memory for buffering data for the first and/or the second subrequest.

* * * * *